(12) United States Patent
Chen

(10) Patent No.: US 7,178,940 B1
(45) Date of Patent: Feb. 20, 2007

(54) REPTILE DUAL FUNCTIONAL LAMP

(76) Inventor: Ming-Chih Chen, 229-7, Chung Cheng 3rd Rd., Taipei Hsien, Ying Ke Chen (TW)

( * ) Notice: Subject to any disclaimer, the term of this patent is extended or adjusted under 35 U.S.C. 154(b) by 0 days.

(21) Appl. No.: 11/162,738

(22) Filed: Sep. 21, 2005

(51) Int. Cl.
*F21V 7/10* (2006.01)

(52) U.S. Cl. .................. 362/216; 362/225; 362/228; 362/231; 362/230

(58) Field of Classification Search ............. 362/216, 362/217, 225, 228, 229, 230, 231, 235, 236, 362/247, 351, 361
See application file for complete search history.

(56) References Cited

U.S. PATENT DOCUMENTS 4,947,291 A * 8/1990 McDermott .............. 362/19
5,924,787 A * 7/1999 McEllen et al. ........... 362/263
2004/0252499 A1* 12/2004 Tumlinson et al. ........ 362/228

* cited by examiner

*Primary Examiner*—Laura Tso
(74) *Attorney, Agent, or Firm*—Alan D. Kamrath; Nikolai & Mersereau, P.A.

(57) ABSTRACT

A dual functional lamp includes a lamp shade, a dual light seat unit mounted in the lamp shade, and a dual light bulb unit mounted on the dual light seat unit and located in the lamp shade. Thus, the dual light bulb unit can emit optical rays outward to provide a warming and illuminating effect and can also emit ultraviolet rays outward, so that the single dual light bulb unit produces two different functions, thereby enhancing the versatility of the dual functional lamp. In addition, the dual light bulb unit is fully hidden in the lamp shade, so that the dual functional lamp has a smaller volume, thereby saving the space of storage, and thereby facilitating storage, package and transportation of the dual functional lamp.

10 Claims, 4 Drawing Sheets

REPTILE DUAL FUNCTIONAL LAMP

BACKGROUND OF THE INVENTION

1. Field of the Invention

The present invention relates to a lamp, and more particularly to a dual functional lamp for a pet (such as reptile or the like) cage.

2. Description of the Related Art

A conventional lamp for a pet cage comprises a lamp shade, and an electric bulb mounted on the lamp shade to provide a determined heat. However, the electric bulb protrudes from the lamp shade, so that the lamp has a greater volume and occupies a larger space of the pet cage. In addition, it is necessary to provide an ultraviolet lamp in the pet cage so that the pet cage is provided with two lamps, thereby causing inconvenience to a user in operation of the two lamps.

SUMMARY OF THE INVENTION

In accordance with the present invention, there is provided a dual functional lamp, comprising a lamp shade, a dual light seat unit mounted in the lamp shade, and a dual light bulb unit mounted on the dual light seat unit and located in the lamp shade.

The primary objective of the present invention is to provide a dual functional lamp, wherein the dual light bulb unit can emit optical rays outward to provide a warming and illuminating effect and can also emit ultraviolet rays outward to enhance the calcium contents, so that the single dual light bulb unit produces two different functions, thereby enhancing the versatility of the dual functional lamp.

Another objective of the present invention is to provide a dual functional lamp, wherein the dual light bulb unit is fully hidden in the lamp shade, so that the dual functional lamp occupies smaller space.

A further objective of the present invention is to provide a dual functional lamp, wherein the dual functional lamp has a smaller volume, thereby saving the space of storage, and thereby facilitating storage, package and transportation of the dual functional lamp.

Further benefits and advantages of the present invention will become apparent after a careful reading of the detailed description with appropriate reference to the accompanying drawings.

DETAILED DESCRIPTION OF THE INVENTION

Figure 1:
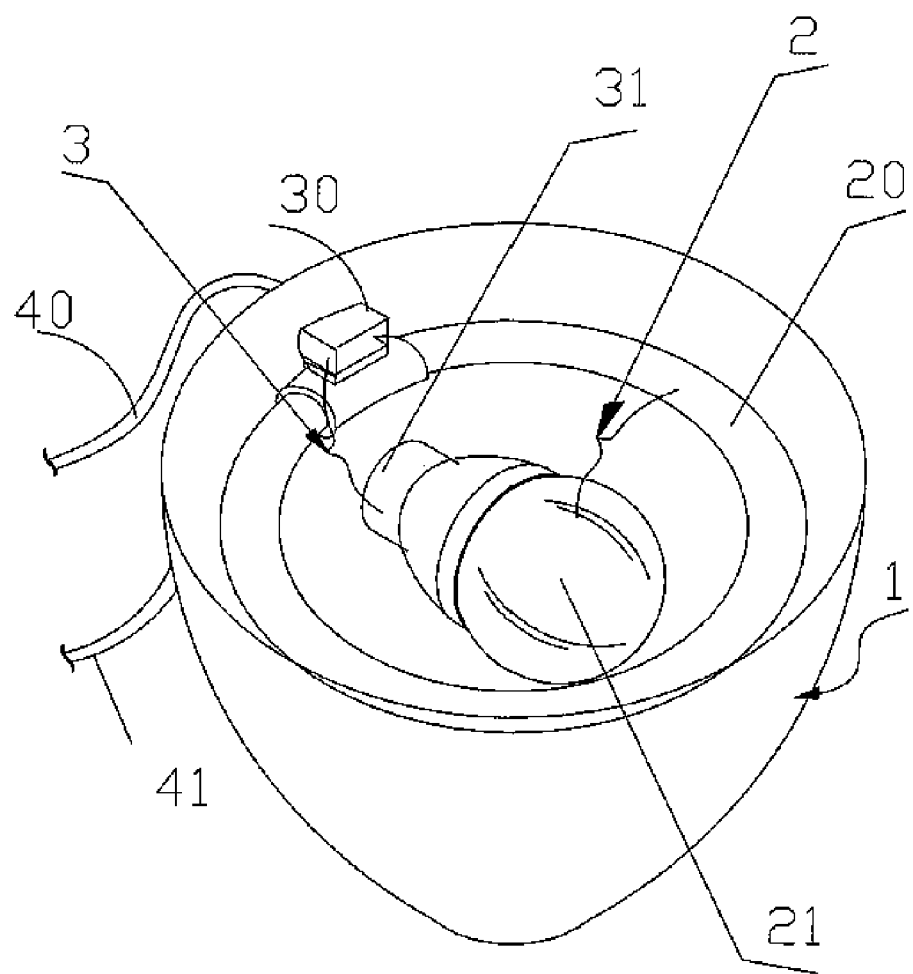
FIG. 1 is a perspective view of a dual functional lamp in accordance with the preferred embodiment of the present invention.
Figure 2:
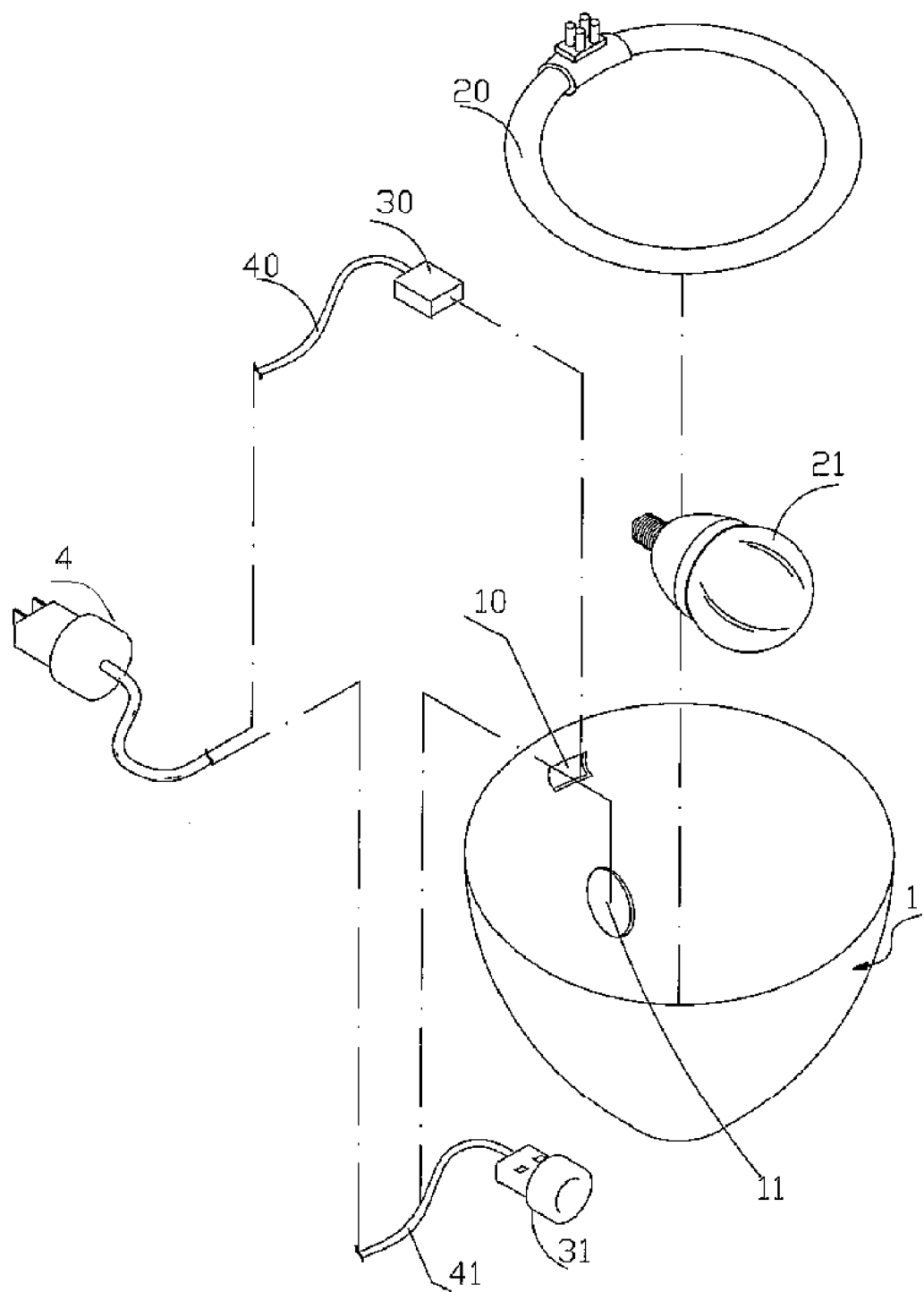
FIG. 2 is an exploded perspective view of the dual functional lamp as shown in FIG. 1.
Figure 3:
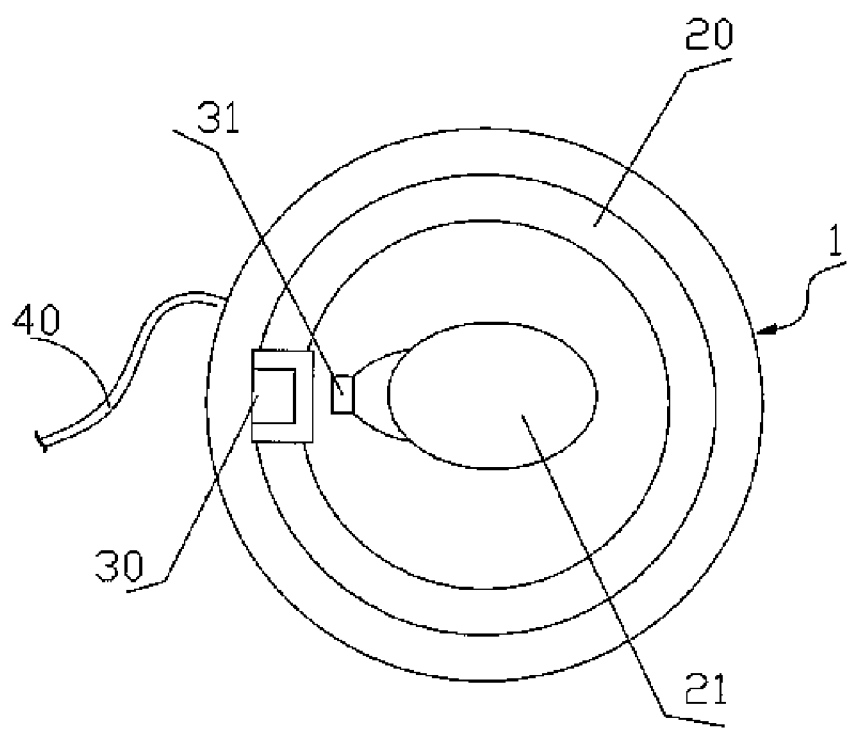
FIG. 3 is a top plan view of the dual functional lamp as shown in FIG. 1.
Figure 4:
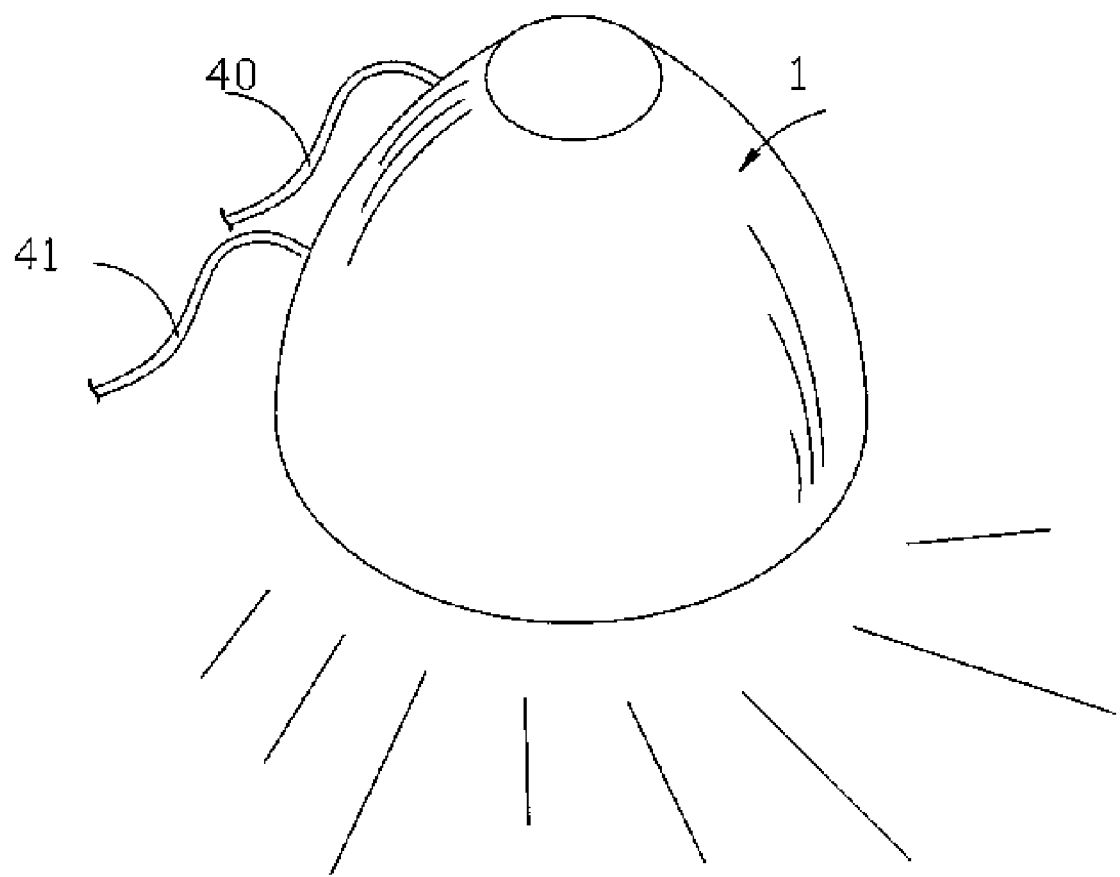
FIG. 4 is a schematic operational view of the dual functional lamp as shown in FIG. 1 in use.

Referring to the drawings and initially to FIGS. 1–3, a dual functional lamp in accordance with the preferred embodiment of the present invention comprises a lamp shade 1, a dual light seat unit 3 mounted in the lamp shade 1, a dual light bulb unit 2 mounted on the dual light seat unit 3 and located in the lamp shade 1, and a power supply 4 electrically connected to the dual light seat unit 3 to supply an electric power to the dual light bulb unit 2.

The lamp shade 1 has a conical shape. The lamp shade 1 has a periphery formed with a first mounting hole 10 and a second mounting hole 11.

The dual light seat unit 3 includes a first light seat 30 mounted in the first mounting hole 10 of the lamp shade 1, and a second light seat 31 mounted in the second mounting hole 11 of the lamp shade 1.

The dual light bulb unit 2 is fully hidden in the lamp shade 1 and includes a first light bulb 20 mounted on the first light seat 30 of the dual light seat unit 3, and a second light bulb 21 mounted on the second light seat 31 of the dual light seat unit 3. The first light bulb 20 of the dual light bulb unit 2 is located at an inner periphery of the lamp shade 1, and the second light bulb 21 of the dual light bulb unit 2 is located at a central portion of the lamp shade 1.

Preferably, the first light bulb 20 of the dual light bulb unit 2 is an annular light bulb, and the second light bulb 21 of the dual light bulb unit 2 is a drop-shaped light bulb. In addition, the first light bulb 20 and the second light bulb 21 of the dual light bulb unit 2 have two different functions so that the dual light bulb unit 2 can emit optical rays outward to provide a warming and illuminating effect and can also emit ultraviolet rays outward to enhance the calcium contents.

The power supply 4 includes a first electric wire unit 40 electrically connected to the first light seat 30 of the dual light seat unit 3 to supply an electric power to the first light bulb 20 of the dual light bulb unit 2, and a second electric wire unit 41 electrically connected to the second light seat 31 of the dual light seat unit 3 to supply an electric power to the second light bulb 21 of the dual light bulb unit 2.

Referring to FIGS. 1–4, the power supply 4 supplies the electric power through the dual light seat unit 3 to the dual light bulb unit 2 which can emit optical rays outward to provide a warming and illuminating effect and can also emit ultraviolet rays outward to enhance the calcium contents, so that the dual functional lamp produces two different functions, thereby enhancing the versatility of the dual functional lamp.

Accordingly, the dual light bulb unit 2 can emit optical rays outward to provide a warming and illuminating effect and can also emit ultraviolet rays outward to enhance the calcium contents, so that the single dual light bulb unit 2 produces two different functions, thereby enhancing the versatility of the dual functional lamp. In addition, the dual light bulb unit 2 is fully hidden in the lamp shade 1, so that the dual functional lamp occupies smaller space. Further, the dual functional lamp has a smaller volume, thereby saving the space of storage, and thereby facilitating storage, package and transportation of the dual functional lamp.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A dual functional lamp, comprising:
   a lamp shade;
   a dual light seat unit mounted in the lamp shade;
   a dual light bulb unit mounted on the dual light seat unit and located in the lamp shade;
   wherein the dual light seat unit includes a first light seat and a second light seat combined with the first light seat;
   the dual light bulb unit includes a first light bulb mounted on the first light seat of the dual light seat unit, and a second light bulb mounted on the second light seat of the dual light seat unit; and the first light bulb and the second light bulb of the dual light bulb unit have two different functions so that the dual light bulb unit can emit optical rays outward to provide a warming and illuminating effect and can also emit ultraviolet rays outward to enhance the calcium contents.

2. The dual functional lamp in accordance with claim 1, wherein the lamp shade has a conical shape.

3. The dual functional lamp in accordance with claim 1, wherein the lamp shade has a periphery formed with a first mounting hole and a second mounting hole, the first light seat of the dual light seat is mounted in the first mounting hole of the lamp shade, and the second light seat of the dual light seat is mounted in the second mounting hole of the lamp shade.

4. The dual functional lamp in accordance with claim 1, wherein the dual light bulb unit is fully hidden in the lamp shade.

5. The dual functional lamp in accordance with claim 1, wherein the first light bulb of the dual light bulb unit is an annular light bulb.

6. The dual functional lamp in accordance with claim 1, wherein the second light bulb of the dual light bulb unit is a drop-shaped light bulb.

7. The dual functional lamp in accordance with claim 1, further comprising a power supply electrically connected to the dual light seat unit to supply an electric power to the dual light bulb unit.

8. The dual functional lamp in accordance with claim 7, wherein the power supply includes a first electric wire unit electrically connected to the first light seat of the dual light seat unit to supply an electric power to the first light bulb of the dual light bulb unit, and a second electric wire unit electrically connected to the second light seat of the dual light seat unit to supply an electric power to the second light bulb of the dual light bulb unit.

9. The dual functional lamp in accordance with claim 1, wherein the first light bulb of the dual light bulb unit is located at an inner periphery of the lamp shade.

10. The dual functional lamp in accordance with claim 1, wherein the second light bulb of the dual light bulb unit is located at a central portion of the lamp shade.

* * * * *